United States Patent [19]

Milkes

[11] 4,103,115
[45] Jul. 25, 1978

[54] MEMORY TONE DIALER

[75] Inventor: Paul Milkes, Encino, Calif.

[73] Assignee: American Communication Systems, Inc., Encino, Calif.

[21] Appl. No.: 756,288

[22] Filed: Jan. 3, 1977

[51] Int. Cl.² ............................................. H04M 1/51
[52] U.S. Cl. ................................................. 179/90 B
[58] Field of Search ............. 179/90 K, 90 B, 90 BB, 179/90 BD, 2 DP, 90 R

[56] References Cited

U.S. PATENT DOCUMENTS

| | | | |
|---|---|---|---|
| 3,692,962 | 9/1972 | Raczynski | 179/90 B |
| 3,718,771 | 2/1973 | Bank | 179/90 B |
| 3,858,009 | 12/1974 | Mickowski | 179/90 B |
| 3,891,940 | 6/1975 | Sekiguchi | 179/90 K |

OTHER PUBLICATIONS

Radio-Electronics, Jan., 1976, "Build This Pocket Data Terminal" Charles Edwards, pp. 29–32, part II of above in Feb. issue, pp. 60–61.

Primary Examiner—William C. Cooper
Assistant Examiner—Gerald L. Brigance
Attorney, Agent, or Firm—Spensley, Horn & Lubitz

[57] ABSTRACT

A memory tone dialer for touch-tone telephone lines. The tone dialer comprises a touch tone keyboard, a means for generating tones which correspond to the keys of the keyboard, and a programmable means for remembering at least two sequences of numbers which may be telephone numbers or sets of numbers. In the preferred embodiment, the tones generated by the tone dialer may be coupled to a telephone system by a speaker or a jack.

1 Claim, 1 Drawing Figure

MEMORY TONE DIALER

FIELD OF INVENTION

This invention relates to tone generators and more particularly to push button tone generators utilized in conjunction with a telephone system.

DESCRIPTION OF THE PRIOR ART

With the advent of the touch tone telephone system, there has developed a need for transmitting devices which generate the required telephone tones. Such transmitting devices include dual tone generating multifrequency circuits, commonly referred to as the touch tone type of telephone. Another such device is the portable tone data transmitter which is the subject of U.S. Pat. No. 3,899,638 issued to James Hahn on Aug. 12, 1975. Both of the aforementioned devices suffer from two drawbacks. First of all, the tones generated are of low stability. Second of all, neither of the aforementioned transmitting devices is capable of remembering a telephone number.

In order to overcome these difficulties, systems have been developed which utilizes a crystal controlled tone generator which is capable of remembering a single seven-digit telephone number. Such a device is disclosed in the January, 1976 issue of Radio and Electronics. Even though this device does generate a tone with a more stable frequency and does have the capability of storing a single seven-digit number, programming of the seven-digit number into the memory means is very difficult and requires that the hard wire circuitry of the device be physically altered to achieve the programming. Furthermore, such device is only capable of remembering one seven-digit telephone number and has no capability to remember a second telephone number.

The desirability of being able to remember two sequences of numbers has increased with the advent of computer controlled telephone access systems. Such systems typically require that a user dial some telephone number to connect with the system and then to send some identification number to the computer via the telephone system. Accordingly, this typically requires that one first dial a seven-digit number and then dial a five-digit identification number. If one is only capable of automatically transmitting just the seven-digit telephone number, the user is presented with the problem of having to remember the five-digit identification number and dialing it into the system. Having the user remember the number presents another peculiar problem. This additional problem is that if a company leases a computer controlled access telephone system and must tell its employees the identification number, a certain percentage of the employees will tell their friends and the usage of the system leased by the company will be greatly increased thereby greatly increasing the cost of leasing. Accordingly, it is very desirable that any tone dialer to be utilized to access a computer controlled telephone system be capable of not only remembering the telephone number of the computer, but also the identification number of the leasee.

Accordingly, it is a general object of the present invention to provide a memory tone dialer which capable of remembering at least two sequences of numbers.

It is another object of the present invention to provide a memory tone dialer which is easily programmable without having to physically alter the basic hard wire circuitry of the device.

It is still another object of the present invention to provide a memory tone dialer which is capable of being made in an easily portable form.

It is still another object of the present invention to provide a memory tone dialer which is easy to manufacture and low in cost.

SUMMARY OF THE INVENTION

In keeping with the principles of the present invention, the objects are accomplished by a unique memory tone dialer which comprises a touch tone keyboard, a means for generating tones which correspond to the keys of the touch tone keyboard and a programmable means for remembering at least two sequences of numbers which may be telephone numbers or sets of numbers. In particular, the memory tone dialer utilizes solid state devices and therefore can be manufactured simply and in a small portable package. Furthermore, in the preferred embodiment, the means for generating tones is crystal controlled and the programmable memory means includes a miniature plug board upon which the sequences of numbers can be programmed. Furthermore, the remembered numbers can be accessed by depressing only a single key switch on the touch tone keyboard.

BRIEF DESCRIPTION OF THE DRAWINGS

The above mentioned and other features and objects of the present invention will become more apparent by reference to the following description taken in conjunction with the accompanying drawings, wherein like referenced numerals denote like elements, and in which.

DESCRIPTION OF THE PREFERRED EMBODIMENT

Figure 1:
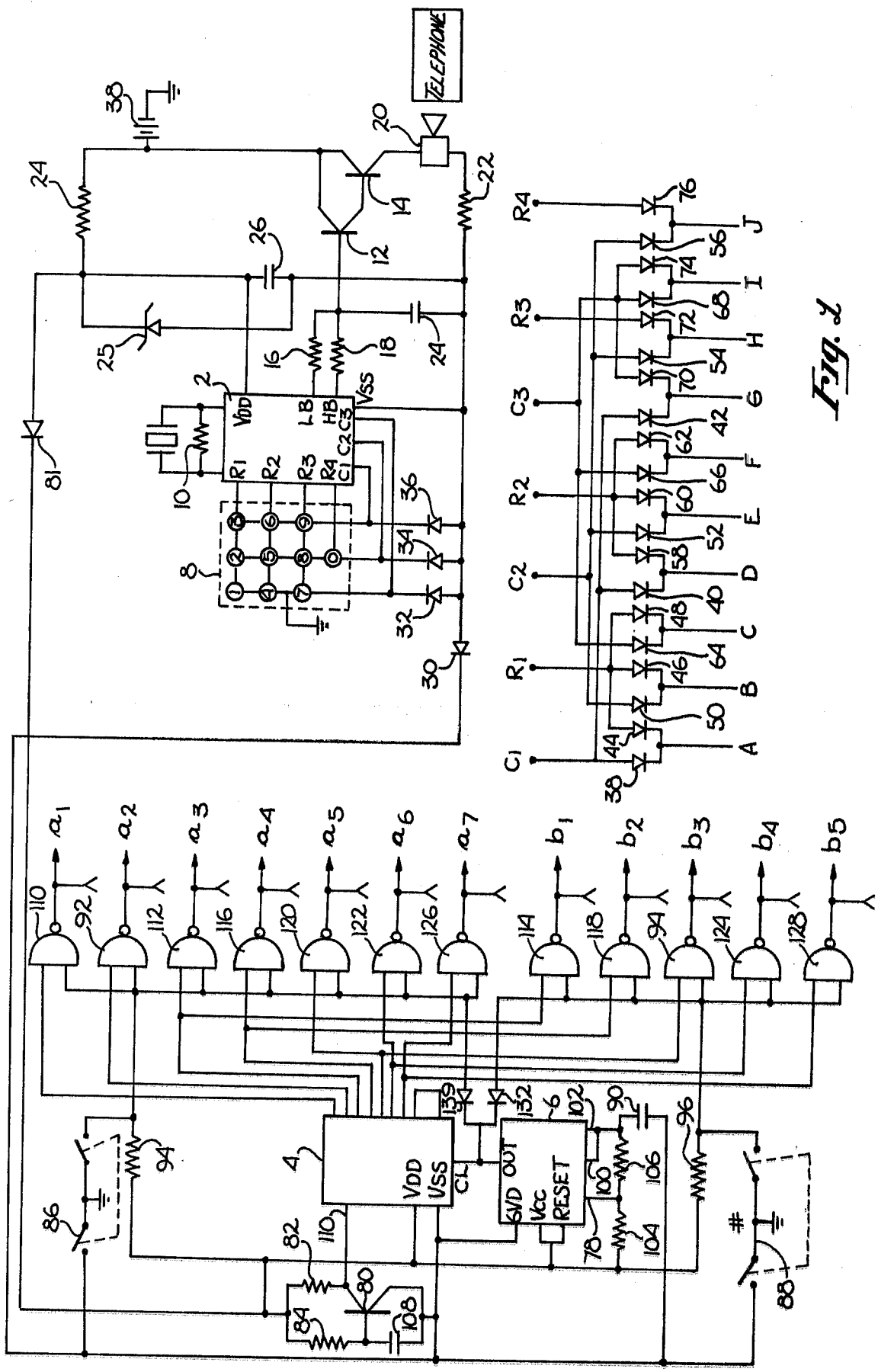
FIG. 1 is a circuit diagram of a memory tone dialer in accordance with the teachings of the present invention.

Referring to FIG. 1, shown therein is a schematic diagram of a memory tone dialer in accordance with the teachings of the present invention. The memory tone dialer is essentially made from CMOS and LPTTL devices and is broken down into three major devices. The devices are the tone generator 2, the sequencer 4 and the clock 6.

Electrically coupled to the R1 terminal of the tone generator 2 are the 1, 2 and 3 push-button switches of the touch pad keyboard 8. The 4, 5 and 6 switches of the touch pad keyboard 8 are connected to the R2 terminal of the tone generator 2. The 7, 8 and 9 push-button switches of the touch pad keyboard are connected to the R3 terminal of the tone generator 2. The zero key switch of the touch pad keyboard 8 is connected to the R4 terminal of the tone generator 2. The 1, 4 and 7 key switches of the touch pad keyboard 8 is connected to the $C_1$ terminal of the tone generator 2. The 2, 5, 8 and 10 key switches of the touch pad keyboard 8 are coupled to the $C_2$ terminal of the tone generator 2 and the 3, 6 and 9 key switches of the touch pad keyboard 8 are connected to the $C_3$ terminal of the tone generator 2. The switches are single pole double throw switches connected in a 2 × 7 matrix configuration.

A crystal $X_1$ in parallel with a resistor 10 is coupled to the tone generator 2. The collectors of transistors 12 and 14 are coupled to the positive terminal of battery 28. The LB terminal of tone generator 2 is coupled via resistor 16 to the base of transistor 12. The emitter of transistor 12 is coupled to the base of transistor 14. The HB terminal of tone generator 2 is coupled to the base of transistor 12 via resistor 18. The emitter of transistor 14 is coupled to one side of speaker 20. The other terminal of speaker 20 is coupled via resistor 22 to a terminal formed by the $V_{SS}$ terminal of tone generator 2, one side of capacitor 26, and the anodes of diodes 30, 32, 34 and 36. The other terminal of capacitor 26 is coupled to the $V_{DD}$ terminal of tone generator 2 and one terminal of resistor 24. The other terminal of resistor 24 is coupled to the positive terminal of battery 28. A zener diode 25 is coupled across capacitor 26.

The cathodes of diodes 32 through 36 are coupled respectively to the $C_3$, $C_2$ and $C_3$ terminals of tone generator 2. Terminal $C_1$ of the tone generator 2 is also electrically coupled to the anodes of diodes 38, 40 and 42. The $R_1$ terminal of tone generator 2 is coupled to the anodes of diodes 44, 46 and 48. Terminal $C_2$ is coupled to the anodes of diodes 50, 52, 54 and 56. The $R_2$ terminal of tone generator 2 is coupled to the anodes of diodes 58, 60 and 62. The $C_3$ terminal of tone generator 2 is coupled to the anodes of diodes 64, 66 and 68. The $R_3$ terminals of tone generator 2 is coupled to the anodes of diodes 70, 72 and 74. The $R_4$ terminal of tone generator 2 is coupled to the anode of diode 76. The cathodes of diodes 38 and 44 are coupled together and connected to plug board terminal A while the cathodes of diodes 50 and 46 are coupled together and connected to plug board terminal B. The cathodes of diodes 64 and 48 are coupled together and coupled to plug board terminal C while the cathodes of diodes 40 and 58 are coupled together and coupled to plug board terminal D. The cathodes of diodes 52 and 60 are coupled together and coupled to plug board terminal E while the cathodes of diodes 66 and 62 are coupled together and coupled to plug board terminal F. The cathodes of diodes 42 and 70, 54 and 72, 68 and 74 and 56 and 76 are coupled together and each pair of cathodes is coupled respectively to plug board terminals G, H, I and J.

The negative terminal of battery 78 is coupled to ground. The junction formed by one terminal of capacitor 26 and one terminal of resistor 24 is coupled respectively to the collector and base of transistor 80 via diode 81 and then resistors 82 and 84. The cathode of diode 30 is coupled respectively to one side of the * switch 86, one side of the # switch 88, the ground input of clock 6 and the $V_SS$ terminal of sequencer 4 and the negative side of capacitor 90. The cathode of diode 30 is further connected to one input of nand gate 92 and one side of * switch 86 via a resistor 94, the $V_DD$ terminal of sequencer 4, the $V_cc$ and reset terminals of clock 6, one input of nand gate 92 and one terminal of # switch 88 via a resistor 96 and to terminals 98, 100, 102 and the positive terminal of capacitor 90 via resistors 104 and 106.

Capacitor 108 is coupled between the emitter and base of transistor 80 and the emitter of transistor 80 is coupled to the $V_{SS}$ terminal of sequencer 4. The collector of transistor 80 is coupled to terminal 110 of sequencer 4. The clock-out terminal of clock 6 is coupled to the clock-in terminal of sequencer 4. The other terminal of * switch 86 and # switch 88 are both coupled to ground.

The first sequential output terminal of sequencer 4 is coupled to one input of nand gate 110. The second sequential output of sequencer 4 is coupled to one input of nand gate 92. The third sequential output of sequencer 4 is coupled to one input of nand gate 112 and nandgate 114. The fourth sequential output of sequencer 4 is coupled to one input of nand gate 116 and nand gate 118. The fifth sequential output of sequencer 4 is coupled to one input of nand gate 120 and nand gate 94. The sixth sequential output of sequencer 4 is coupled to one input of nand gates 122 and 124. The seventh sequential output of sequencer 4 is coupled to one input of nand gates 126 and 128. The other inputs of nand gates 110, 112, 116, 120, 122, 92 and the cathode of diode 130 are coupled together. The other inputs of nand gates 114, 118, 94, 124 and 128 and the cathode of diode 132 are coupled together. The anodes of diodes 130 and 132 are coupled together and connected to the clock input terminal of sequencer 4.

The output of nand gates 110, 92, 112, 116, 120, 122 and 126 are coupled respectively to plugs $a_1$, $a_2$, $a_3$, $a_4$, $a_5$, $a_6$, and $a_7$. The outputs of nand gates 114, 118, 94, 124 and 128 are coupled respectively to plugs $b_1$, $b_2$, $b_3$, $b_4$ and $b_5$.

It should be apparent that the * switch 86 and the # switch 88 are physically located as part of the touch pad keyboard 8. Furthermore, in practice, the tone generator 2 can be a MC14410P, the sequencer can be a CD 4022, the clock 6, can be a NE555, and the nand gates can be SN74103. In addition, the crystal $X_1$ can be a 1MHz crystal and the touch pad keyboard 8 can be a Chromerics ER21606.

In operation, the plugs $a_1$ through $a_7$ represent the first through seventh digits of a telephone number and the plugs $b_1$ through $b_5$ correspond to the five digits of the second memorized sequence of numbers. Furthermore, the plug board terminals A through J correspond to the numbers of the touch pad key board 8, 1 through zero. Accordingly, to program the memory tone dialer to dial a seven-digit phone number, the first digit of the phone number is programmed by connecting the plug $a_1$ to that terminal A through J which corresponds to the number of the first digit of the phone number. The second through seventh digit of the phone number are similarly programmed by connected plugs $a_2$ through $a_7$ to the appropriate plug board terminals A through J. For example, if the phone number was 457-3860, the plugs $a_1$ through $a_7$ would be coupled to plug board terminals D, E, G, C, H, F, J respectively. In a similar manner, the five digit sequence of numbers is programmed by connecting the plugs $b_1$ through $b_5$ to the appropriate plug board terminals A through J.

For the purposes of the following discussion, assume that a telephone number and a number sequence has been programmed into the memory tone dialer in the manner described above. If the desires to transmit the telephone number stored in the memory tone dialer, one first places the speaker 20 adjacent the microphone portion of a telephone coupled to a telephone system. Then one need only depress the * key switch 86. Closure of the * key 86 causes a ground to be applied to both the tone generator 2 and sequencer 4. Furthermore, the sequencer 4 is reset and clock 6 starts to run. The sequencer 4 then generates output pulses sequentially on the first through seventh sequential output terminal. The tone generator 2 is then driven by the nand gates 110, 92, 112, 116, 120, 122 and 126 via the plugs $a_1$ through $a_7$ and plug board terminals A through J. The tone generator 2 then generates the required tones which correspond to the telephone and applies them to the speaker 20. Speaker 20 couples the generated tones to the microphone of the telephone instrument, not shown. In a similar manner, the number sequence corresponding to the interconnection of plugs $b_1$ through $b_5$ to the required plug board terminals A through J is generated by depressing the # key 88.

The memory tone dialer can also be used to generate the required tones to dial an unmemorized telephone number by depressing the appropriate keys 1 through 0 on the touch pad keyboard 8.

It should be apparent to one skilled in the art that a power supply which converts standard 110 volt AC to a DC voltage suitable to operate the memory tone dialer can be substituted for the battery 78. Furthermore, a cable which directly interconnects with the telephone system may be substituted for the speaker 20. In addition, it should be apparent that by extending the circuitry described, that the five-digit sequence of numbers could be extended to seven and that the total memory capacity of the memory tone dialer could be increased to three or more sequences of numbers. Also, the keys could bear other legends and the memory tone dialer can be designed to generate the required number by depression of any one of the keys.

In all cases it is understood that the above described embodiment is merely illustrative of but one of the many possible specific embodiments which represent application of the principles of the present invention. Numerous and varied other arrangements can be readily devised by those skilled in the art without departing from the spirit and scope of the invention.

I claim:

1. A memory tone dialer for use with a telephone system comprising:

a keyboard, said keyboard comprising a plurality of push button key switches;

a means for generating tones which correspond to said switches of said keyboard;

a programmable means for remembering at least two sequences of numbers, said programmable means further causing said generating means to generate a sequence of tones corresponding to one of said two sequences of numbers when at least one of said plurality of push button switches of said keyboard is operated and to generate a sequence of tones corresponding to another one of said two sequences of numbers when at least another one of said plurality of push button switches of said keyboard is operated; and a means for coupling said generated tones to said telephone system, wherein said programmable means includes a clock circuit coupled to sequencing means for serially activating an ordered sequence of outputs of said sequencing means in response to said clock circuit, each said output being coupled to a logic gate with at least one of said outputs being coupled to more than one logic gate, said logic gates coupled to said outputs forming a plurality of sets of logic gates wherein each set corresponds to one of said sequences of numbers, each logic gate having an output selectively coupled by a temporary plug board connection to said means for generating tones through a diode matrix, said diode matrix having a plurality of inputs coupled through a plurality of diodes to predetermined pairs of inputs to said means for generating tones, each said set of logic gates being selectively enabled by activation of one of said push button switches of said keyboard, whereby one of a plurality touch tone number sequences is automatically dialed, said number sequence being mechanically user programmable by selectively a one-to-many mapping from said sequence to said sets of logic gates and a many-to-one mapping from said sets of logic gates to said tone generating means.

* * * * *